US011878439B2

(12) United States Patent
Finstrom et al.

(10) Patent No.: US 11,878,439 B2
(45) Date of Patent: Jan. 23, 2024

(54) HOLE PUNCH

(71) Applicant: Mayer Engineering, LLC, Dayton, MN (US)

(72) Inventors: James A Finstrom, Brooklyn Park, MN (US); Todd M. Mayer, Dayton, MN (US)

(73) Assignee: Mayer Engineering, LLC, Dayton, MN (US)

( * ) Notice: Subject to any disclaimer, the term of this patent is extended or adjusted under 35 U.S.C. 154(b) by 231 days.

(21) Appl. No.: 17/246,404

(22) Filed: Apr. 30, 2021

(65) Prior Publication Data

US 2021/0402641 A1 Dec. 30, 2021

Related U.S. Application Data

(60) Provisional application No. 63/102,673, filed on Jun. 26, 2020.

(51) Int. Cl.
*B26F 1/14* (2006.01)

(52) U.S. Cl.
CPC .................................... *B26F 1/14* (2013.01)

(58) Field of Classification Search
CPC ..... B26F 1/14; B26F 1/36; B26F 1/02; B26D 7/2628
USPC .............................. 83/669, 684–691, 698.91
See application file for complete search history.

(56) References Cited

U.S. PATENT DOCUMENTS 2,137,716 A * 11/1938 Faas .......................... B26F 1/36 83/628
3,910,093 A 10/1975 Maloney et al.
3,994,055 A 11/1976 Maloney, Jr. et al.
4,909,893 A * 3/1990 Lee .......................... B26D 7/34 156/518
5,601,006 A * 2/1997 Quinn ....................... B26F 1/32 83/613
6,289,709 B1 9/2001 Geurts
D654,773 S 2/2012 Moore
2003/0070523 A1 * 4/2003 Lin .......................... B26F 1/36 83/669

(Continued)

FOREIGN PATENT DOCUMENTS

CN 113000668 A * 6/2021
JP 2006207339 A 8/2006

OTHER PUBLICATIONS

Senox Corporation, Mini Black MAX Punch Pak for Flat Bottom Gutters, 2 pages, https://senox.com/wp-content/ uploads/2014/07/pl_mini_black_max_punch_pak_flat_bottom_gutters.pdf.

*Primary Examiner* — Jennifer S Matthews
(74) *Attorney, Agent, or Firm* — Laabs Intellectual Property

(57) ABSTRACT

A hole punch for forming a hole in metal or other material is provided. In some embodiments, the punch comprises a first assembly that is positioned on one side of the device to be punched and a second assembly is positioned on the other side. One of the assemblies comprises a male punch and the other comprises a female die plate. In some embodiments, rotation of a bolt causes the male punch to move through the device to be punched and into the female die plate. In some embodiments, the device to be punched is a rain gutter. In some embodiments, one or both of the first and second assemblies have magnets so that the punch can be releasably assembled with the assemblies on either side of the device to be punched.

20 Claims, 11 Drawing Sheets

(56) References Cited

U.S. PATENT DOCUMENTS

| | | | | |
|---|---|---|---|---|
| 2006/0144206 | A1* | 7/2006 | Lee | B26D 7/26 83/684 |
| 2014/0083272 | A1* | 3/2014 | Carey | B26F 1/14 83/454 |
| 2014/0318343 | A1* | 10/2014 | Chang | B26F 1/14 30/364 |

* cited by examiner

HOLE PUNCH

CROSS-REFERENCE TO RELATED APPLICATIONS

This application claims the benefit of U.S. Patent Application No. 63/102,673, filed Jun. 26, 2020, the entire content of which is hereby incorporated herein by reference.

TECHNICAL FIELD

The present invention relates generally to manual cutting tools, and more particularly to a new and unique punch tool for cutting holes in metal structures such as rain gutters.

BACKGROUND OF THE INVENTION

Rain gutters are typically roll-formed into the desired lengths by gutter machines from coils of flat metal, such as aluminum, and then cut to length as needed. Outlet holes must then be cut into the gutters for attachment of the downspouts, usually near the ends of the gutters. However, location of the gutter outlet holes depends upon the downspout location after installation or hanging of the gutters.

In the past, such gutter outlet holes have been cut manually by the gutter installers, such as with tin snips or electric hole saws, after which a circular or rectangular flanged outlet tube is pushed into the hole, screwed in place, and sealed with caulk for attachment of the downspout. This technique can be used either before or after the gutters are hung on, the buildings, although it is safer and less difficult and time-consuming for the installers to do this on the ground before hanging the gutters.

Various manual punch tools have also been available heretofore for this purpose, although they have not been without certain drawbacks. For example, U.S. Pat. No. 6,289,709 shows a gutter outlet punch that incorporates a ratchet handle. The gutter outlet punch shown therein is of one-piece construction, is not adjustable and tends to be cumbersome and unwieldly to use, especially when trying to form outlet holes after the gutters have been hung on a building.

U.S. Pat. Nos. 3,910,093 and 3,994,055 to Maloney show a method and apparatus for forming rain gutter outlet holes by cutting an X in the gutter and then bending the resultant triangular tabs downward for attachment to the downspouts, which eliminates the need for separate outlet tubes.

U.S. Pat. No. D654,773 to Moore shows a two-piece gutter cutting device comprised of upper and lower cutting dies.

However, there has not been available heretofore an adjustable punch tool for cutting gutter outlet holes which is of lightweight and compact construction.

A need has thus arisen for a gutter hole punch of lightweight, compact construction and method for accurately cutting outlet holes either before or after the gutters are hung to reduce the difficulties associated with the prior techniques.

SUMMARY OF THE INVENTION

The present invention comprises an improved rain gutter outlet hole punch which overcomes the foregoing and other difficulties associated with the prior art. In accordance with the invention, the gutter hole punch herein comprises opposing upper and lower bodies or subassemblies which are releasably secured in place over a pilot hole made in the desired gutter outlet location. The upper subassembly includes a male die punch mounted for movement between an upper position away from the gutter and a lower, cutting position within a female die in the lower subassembly. Its movement is guided by a bolt threadedly secured between the bodies. The male die punch is normally biased towards the upper, disengaged position. Using the various embodiments described herein, outlet holes can accurately and quickly cut in gutters before or after they have been hung on a building, thus avoiding the difficulties and unnecessary costs associated with the prior art.

In some embodiments, a punch comprises a first body and a second body. The first body comprises a first portion, a second portion and a spring. The second portion is moveable with respect to the first portion. The spring is arranged to bias the second portion to a first position with respect to the first portion. The first portion comprises a guide plate. The second portion comprises a first die and a first threaded member. The second body comprises a second die and a second threaded member. The second die comprises an aperture arranged to receive the first die and the second threaded member is arranged to engage the first threaded member.

In some embodiments, a punch comprises a first body, a second body and a magnet. The first body comprises a first die and a first threaded member. The second body comprises a second die and a second threaded member. The second die comprises an aperture arranged to receive the first die. The second threaded member is arranged to engage the first threaded member. The magnet is arranged to magnetically attract the first body to the second body.

In some embodiments, a punch comprises a first body and a second body. The first body comprises a first die and a first threaded member. The second body comprises a guide, a second die and a second threaded member. The second die comprises an aperture arranged to receive the first die. The second threaded member is arranged to engage the first threaded member. The second die comprises a first orientation with respect to the guide and is repositionable to a second orientation with respect to the guide.

BRIEF DESCRIPTION OF DRAWING

A better understanding of the invention can be had by reference to the following Detailed Description in conjunction with the accompanying drawings, wherein.

DETAILED DESCRIPTION

Figure 1:
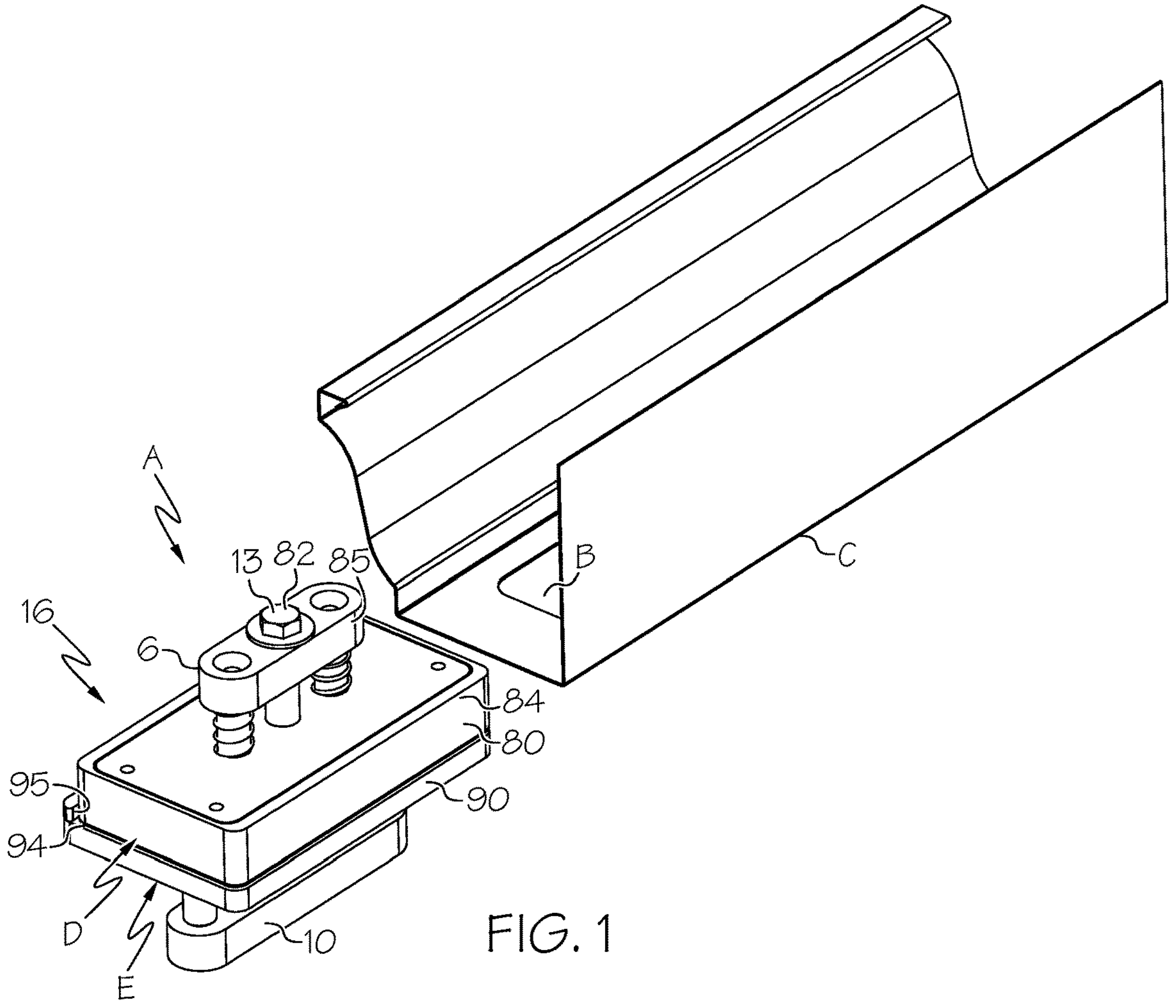
FIG. 1 is a perspective view of the gutter outlet hole punch in accordance with a first embodiment of the present invention, shown exploded away from a typical rain gutter.

Referring now to the Drawing, wherein like reference numerals designate like or corresponding elements throughout the views, and particularly referring to FIG. 1, there is shown a gutter hole punch A for making an outlet hole B in a rain gutter C. Rain gutter C is shown as a typical K-style gutter, although it will be understood that hole punch A can be used with other styles of rain gutters.

Figure 2:
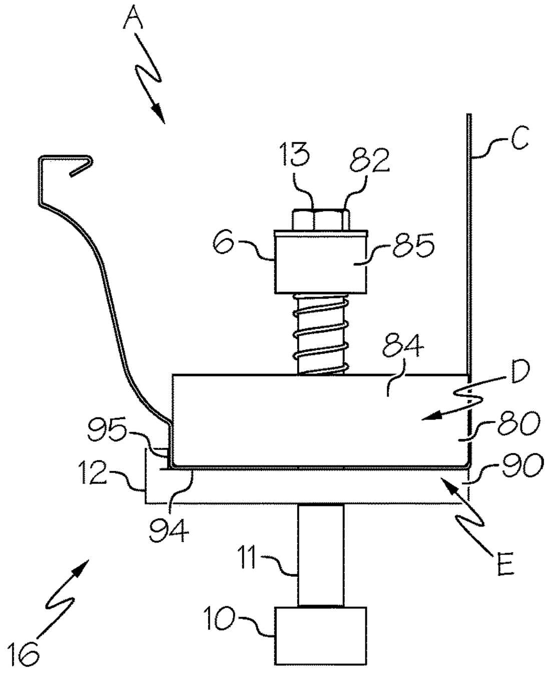
FIG. 2 is a side elevational view thereof shown clamped in place about a rain gutter.
Figure 3:
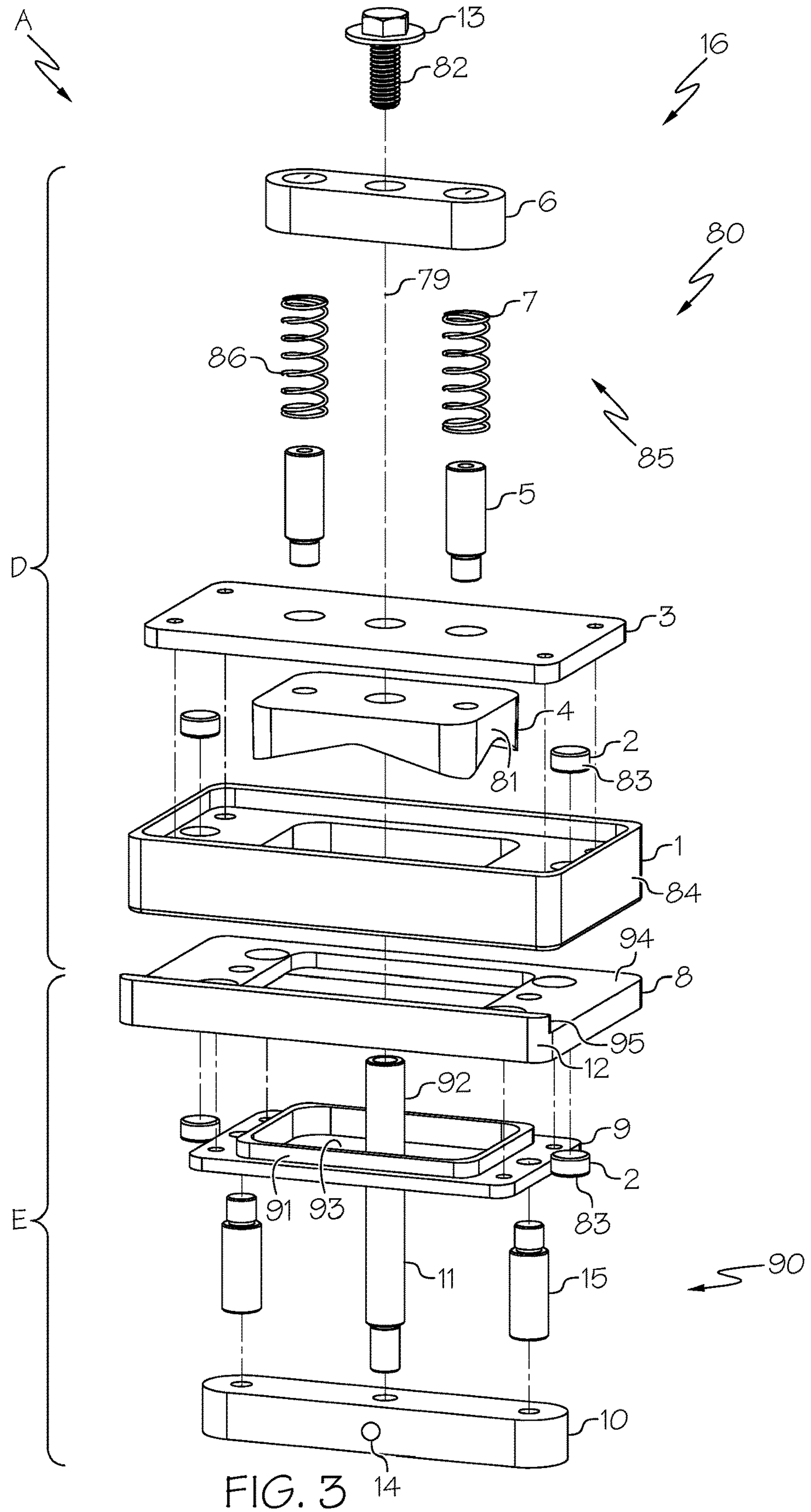
FIG. 3 is an exploded view thereof.

Referring now to FIGS. 2 and 3, the gutter hole punch A includes upper and lower bodies or subassemblies D and E, which are releasably secured together as will be explained below. The upper subassembly D includes a hollow body 1 and a plate 3 that fits into a recess in the top surface of the body 1. Body 1 and plate 3 are secured together with suitable fasteners (not shown).

The upper subassembly D also includes a male die punch 4 mounted on the lower ends of posts 5, the upper ends of which are secured to an upper handle 6. Posts 5 are slidably received by holes in plate 3 as shown, so that the plate 3 and the punch 4 are movable between up and down positions. Compression springs 7 are provided around posts 5 between plate 3 and handle 6 so that the punch 4 is normally biased upwardly towards an up, disengaged position within a corresponding complementary opening through plate 1 as shown.

Body 1 and plate 3 can be formed of any suitable material, such as metal or plastic. Punch 4 can be formed of metal, such as hardened steel. In the preferred embodiment, punch 4 is rectangular, as shown, but could also be square, circular, or oval if desired, with the hole in body 1 being of similar, complementary size and shape.

The lower surface of punch 4 is recessed with a raised sharp peripheral edge so as to cut a clean hole B in gutter C when punch A is actuated.

The lower subassembly E includes a hollow body 8 and a female die plate 9 that fits into a recess in the bottom surface of the body 8, which are secured together with screws or other suitable fasteners (not shown). As will be discussed later, a pilot hole is formed in gutter C prior to positioning upper subassembly D in gutter C and positioning lower assembly E below gutter C. Shaft 11 is positioned through the pilot hole to facilitate positioning of hole punch A in gutter C. A raised lip 12 is preferably provided along one edge of body 8 to facilitate accurate rotational positioning of the punch A in the rain gutter C, as best seen in FIG. 2.

The female die plate 9 includes a central opening corresponding in shape and size to punch 4. In the preferred embodiment, the opening in plate 9 is rectangular, as shown, but could also be square, oval, or circular if desired.

The lower subassembly E also includes a shaft 11 threadedly secured at its lower end to a lower handle 10. Standoff posts 15 are threadedly secured between handle 10 and die plate 9, so that the upper end of the shaft 11 extends upwardly through the central openings in die plate 9 and body 8. When in use, shaft 11 will extend through a pilot hole in the gutter to facilitate the positioning of the hole punch.

Body 8 can be formed of any suitable material, such as metal or plastic. Die plate 9 can be formed of metal, such as hardened steel. In the preferred embodiment, die plate 9 includes an opening that corresponds and is complementary with the male punch 4 for cutting a hole B of the desired size and shape. For example, the male punch 4 and female die plate 9 can be dimensioned to cut a 2×2, 2×3, 3×3, 3×4 or 4×4 inch size hole B in gutter C.

Magnets 2 are preferably located in recesses in the opposing surfaces of bodies 1 and 8, as shown, the upper and lower subassemblies for releasably retaining D and E together when positioning punch A in gutter C for actuation. In some embodiments, only one of bodies 1 and 8 have magnets; the other can be constructed of magnetic material.

Outlet hole B is formed as follows. A pilot hole is first made in the bottom of gutter C in about the middle of the desired location of the outlet hole B to be formed, using a drill or a small electric hole saw. In some embodiments, a step bit is used. In some embodiments the upper subassembly D of gutter punch A can be used as a guide or template for making the pilot hole, by first positioning subassembly D inside the gutter at the desired location of outlet hole B along gutter C. A drill (not shown) is then passed through the center holes in the upper handle 6, plate 3, punch 4 and body 1 to form a pilot hole in the gutter C for receiving the shaft 11.

The lower subassembly E is then positioned underneath gutter C with shaft 11 extending upwardly through the pilot hole in gutter C and center holes in body 1, punch 4 and plate 3 of the upper subassembly D. With the upper and lower subassemblies D and E retained in position by magnets 2, cap screw or shoulder bolt 13 can then be passed through the center hole in the upper handle 6 and screwed into the upper end of shaft 11 to releasably interconnect the subassemblies. As bolt 13 is tightened, male die punch 4 is forced downwardly along shaft 11 and into female die plate 9 to make outlet hole B in the gutter C, with the cutout (not shown) then being captured on shaft 11. Unscrewing bolt 13 allows the upper and lower subassemblies D and E to be disconnected and separated so that gutter hole punch A can then be removed, and an outlet tube (not shown) installed in gutter C.

If desired, a set screw 14 can be provided in lower handle 10 to secure the lower end of shaft 11 against turning or loosening when turning bolt 13.

Although the male die punch 4 herein has been shown as being of rectangular shape with sharpened edges and raised, sharpened corners, it will be understood that other configurations could be used. The male die punch 4 and corresponding opening in plate 9 could be round or oval shaped, for example. Also, the die punch 4 could be configured with blades to make an X cut in gutter C.

Although gutter hole punch A has been shown in a lengthwise position within gutter C, it could also be adapted to fit sideways or crosswise therein, if desired.

Figure 4:
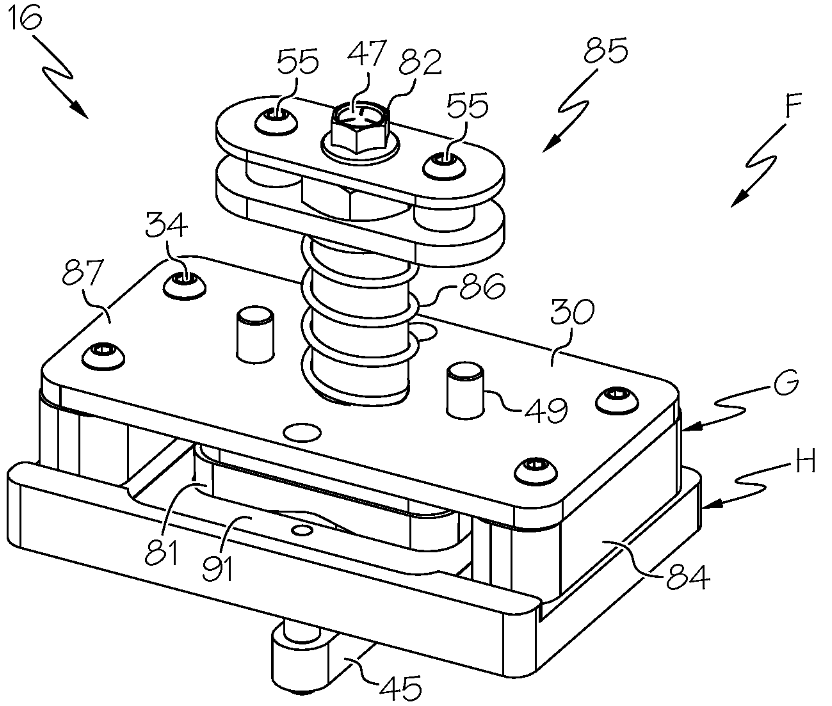
FIG. 4 a perspective view of the gutter outlet hole punch in accordance with a second embodiment of the present invention.
Figure 5A:
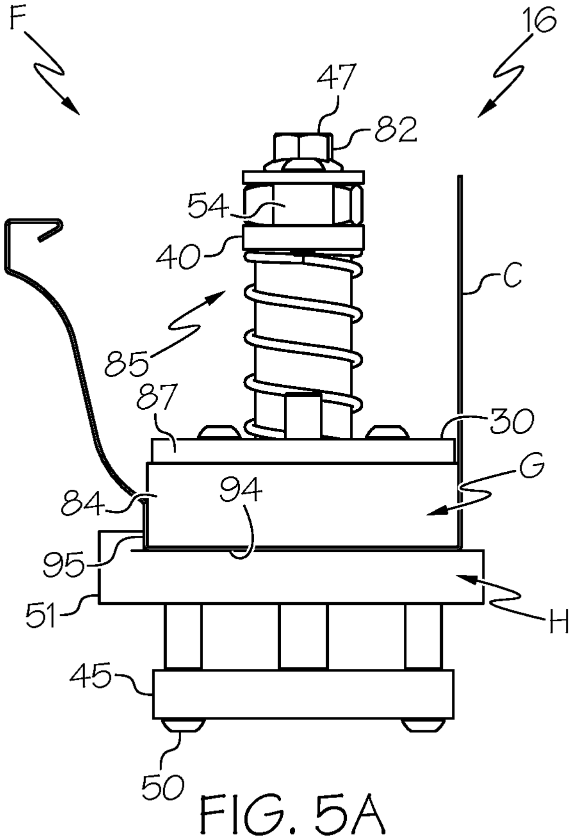
FIG. 5A is a side elevational view thereof shown clamped in place about a rain gutter and FIG. 5B is a cross section view.
Figure 5B:
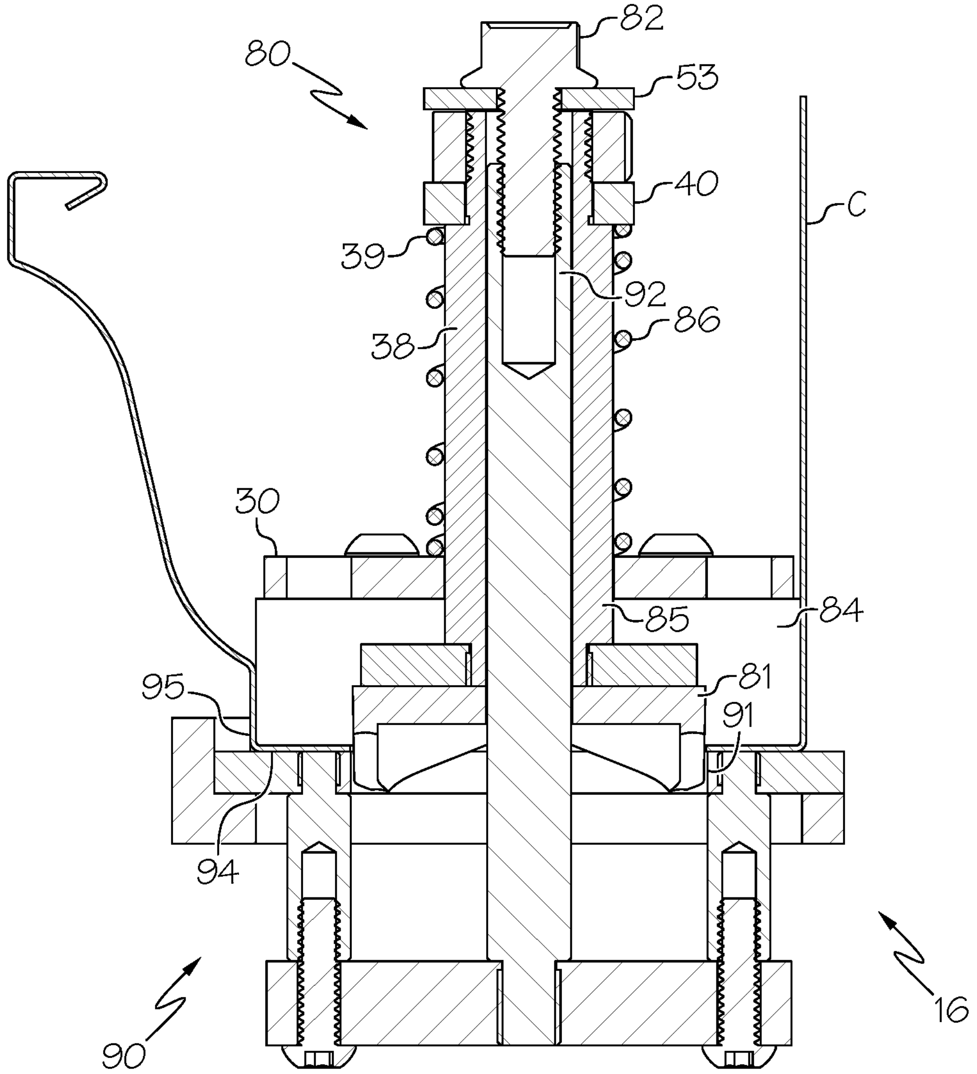
Figure 6:
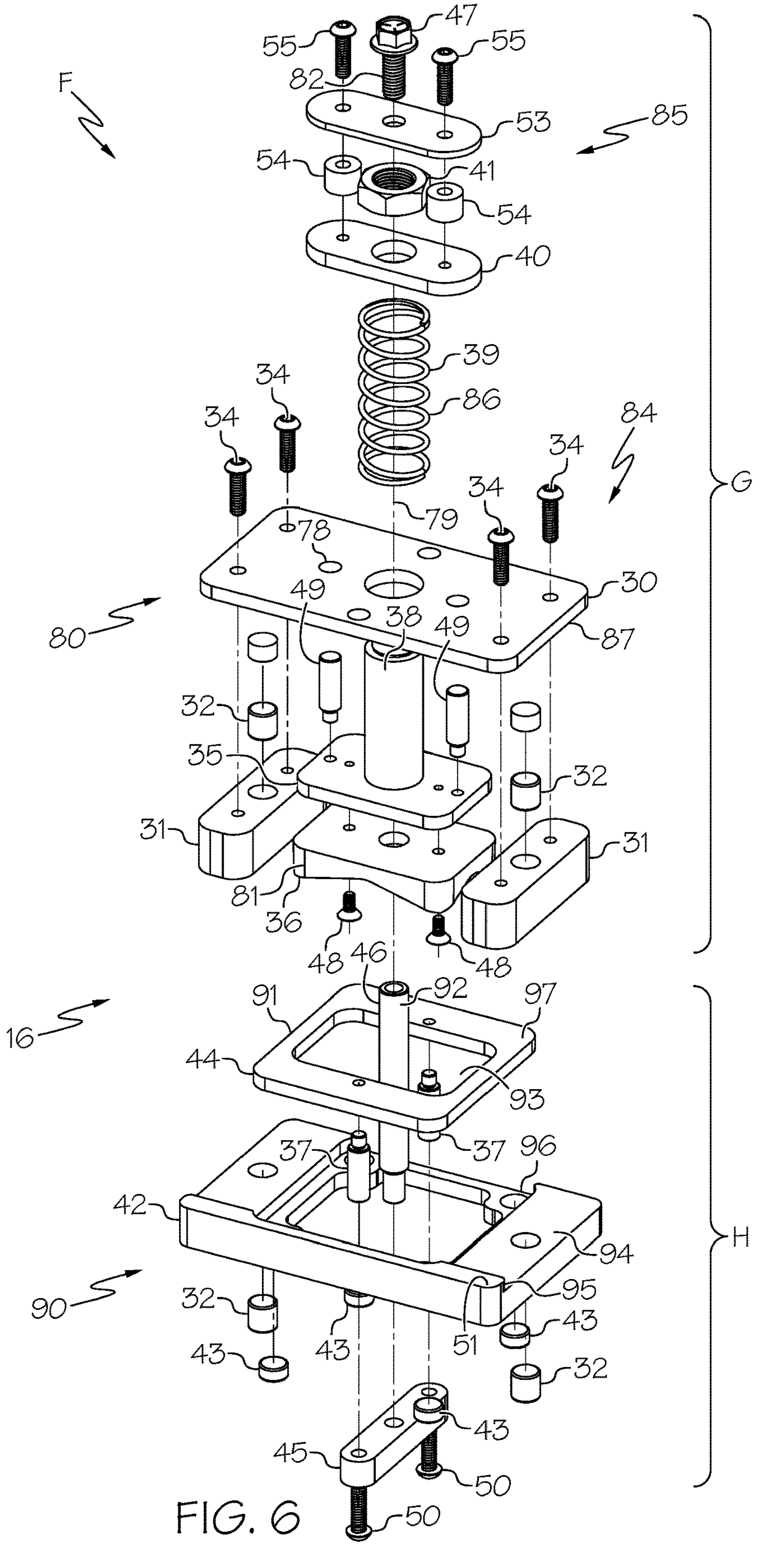
FIG. 6 is an exploded view thereof.

FIGS. 4-6 show a gutter hole punch F incorporating a second embodiment of the present invention. As with the gutter hole punch A of the first embodiment, punch F includes upper and lower bodies or subassemblies G and H, which are releasably secured together in gutter C before clamping actuation, as will be explained below.

The upper body or subassembly G includes a guide plate 30 secured by screws 34 or other suitable fasteners to a pair of spaced-apart end guides 31. A hollow shaft or sleeve 38 extends upwardly through a central hole in guide plate 30. The lower end of sleeve 38 is secured to a spacer plate 35. A pair of guide pins 49 are threadedly secured at their lower ends to plate 35 as well. The upper ends of pins 49 extend through corresponding holes in plate 30, thus providing for relative sliding movement between the plates. A male punch 36 is secured to the underside of plate 35 by screws 48 or other suitable fasteners. A jam nut 41 is threadedly secured to the upper end of sleeve 38 over an upper handle 40. A compression spring 39 is provided around sleeve 38 between plate 30 so that the male punch 36 is normally biased upwardly out of cutting engagement.

The lower subassembly H includes a hollow body or guide 42 and a female die plate 44 that fits into a recess in the top surface of the body 42. Guide 42 and plate 44 can releasably retained together with magnets 43. A raised lip 51 is preferably provided along one edge of guide 42 to facilitate accurate positioning of the punch F in the rain gutter C, as best seen in FIG. 5A.

The lower body or subassembly H also includes a punch shaft 46 threadedly secured at its lower end to a lower handle 45. Standoff posts 37 are threadedly secured between handle 45 and female die plate 44 so that the upper end of the punch shaft 46 extends upwardly through the central openings in the die plate and the upper body or subassembly G. As shown, the upper ends of posts 37 are threadedly secured directly to plate 44, while the lower ends thereof are secured to handle 45 by screws 50. A set screw (not shown) similar to screw 14 can also be provided to in handle 45 to secure shaft 46 against rotation therein.

Magnets 32 are preferably located in recesses in the opposing surfaces of guides 31 and 42, as shown, for releasably retaining the upper and lower subassemblies G and H together when positioning punch F in gutter C. In some embodiments, only one of guides 31 and 42 have magnets or a magnetized material; the other is made of a magnetic material.

After the pilot hole has been formed in gutter C and the upper and lower bodies or subassemblies G and H have been positioned in the gutter C with shaft 46 extending upwardly through the hollow shaft of sleeve 38, the cap screw or bolt 47 can be inserted into the upper end of shaft 46 and tightened down to force male die punch 36 downwardly along the shaft and into female die plate 44 to make outlet hole B in the gutter C, with the cutout (not shown) then being captured on the shaft for removal afterwards along with gutter punch F.

FIG. 5B shows a cross section of FIG. 5A with the device positioned in gutter C and the first die 81 advanced through the gutter C and into second die 91. Movement of first die 81 is caused by the rotation of first threaded member 82 into second threaded member 92, as is described herein.

The die plate 44 is preferably square so that it will fit into guide plate 42 even after rotation by 90°. Two opposing pairs of guide holes are provided in plate 30 at right angles to each other, as shown, so that the punch F can be adjusted to make hole B either lengthwise or crosswise in gutter C. If desired, a hardened washer 53 and spacers 54 and be secured with screws 55 to the upper handle 40 to reduce wear on the upper end of sleeve 38 when bolt 47 is tightened.

Figure 7:
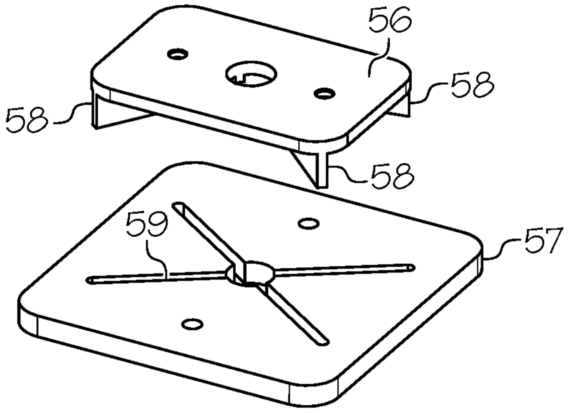
FIG. 7 is an exploded perspective illustration of an interchangeable die punch set for making an X cut in a rain gutter.

FIG. 7 shows a male die punch 56 and a female die plate 57 that can be substituted for the corresponding parts of gutter hole punches A, F, I, and L to make an X cut instead of a hole in gutter C. Punch 56 and plate 57 both include central openings for receiving shafts and/or bolts of gutter hole punches A, F, I, and L respectively. As shown, the underside of punch 56 includes four diagonal blades 58 corresponding to slots 59 in plate 57 to form an X cut when punch A, F, I, and L is actuated.

Figure 8:
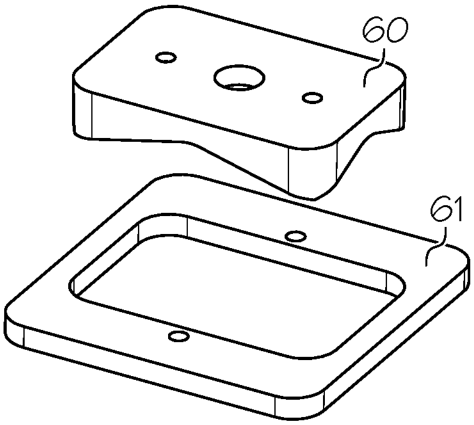
FIG. 8 is an exploded perspective illustration of an interchangeable die punch set for making a rectangular opening in a rain gutter.
Figure 9A:
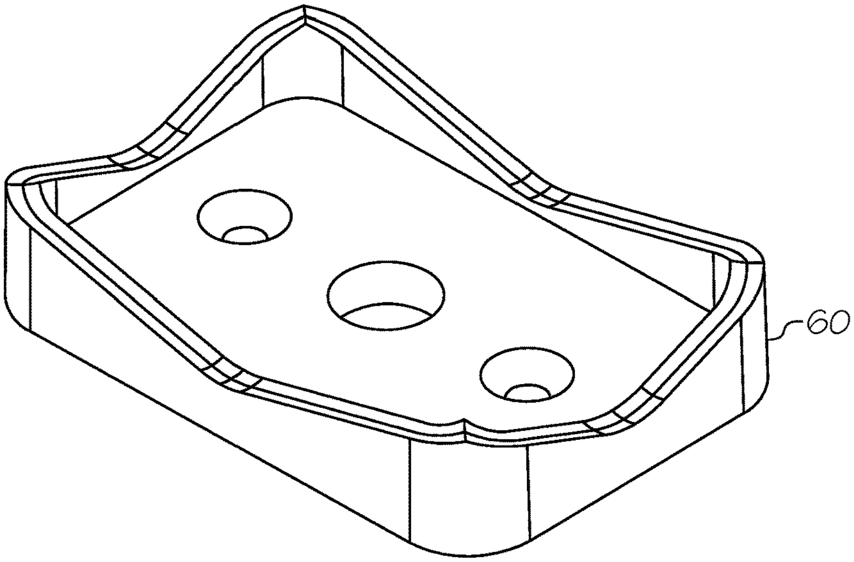
FIGS. 9A, 9B, 9C, and 9D are illustrations of aspects of a rectangular punch.
Figure 9B:
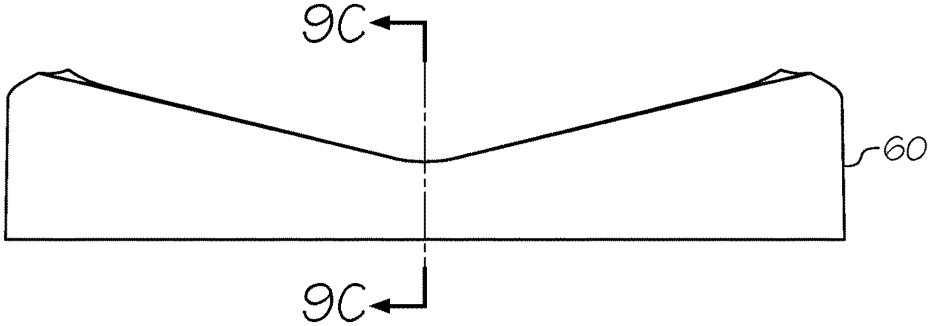
Figure 9C:
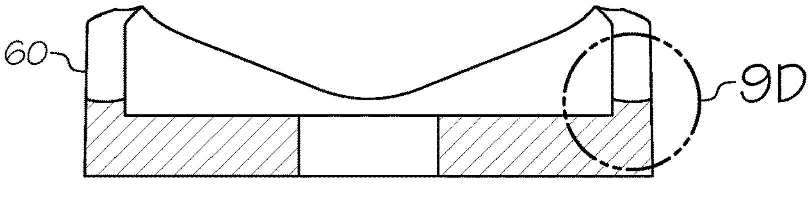
Figure 9D:
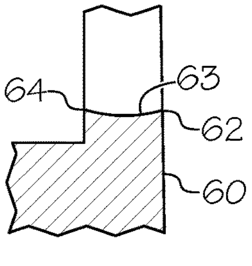

FIG. 8 shows a male die punch 60 and a female die plate 61 according to aspects of the invention that can be used in gutter hole punches A, F, I, and L to make a rectangular opening in gutter C. FIG. 9A is a perspective view and FIG. 9B is a side view of male die punch 60. Die punch 60 can be described as a base with raised edges and with various openings in the base. As shown in these figures, the corners of die punch 60 are raised relative to the sections in-between the corners. The raised edges act as the 'cutter' for the hole punch. FIG. 9C is a section view of FIG. 9B. As shown in FIG. 9D, the raised edge of die punch 60 includes a raised outer edge 62 and a raised inner edge 64. Valley or cup-shaped depression 63 is positioned between the two raised edges. This shape allows for the blade to be sharpened with a spherical or similar shaped grinding element. The rectangular punch and plate size can be 2×2, 2×3, 3×3, 3×4, or 4×4 inches or other sizes and/or shapes.

Figure 10:
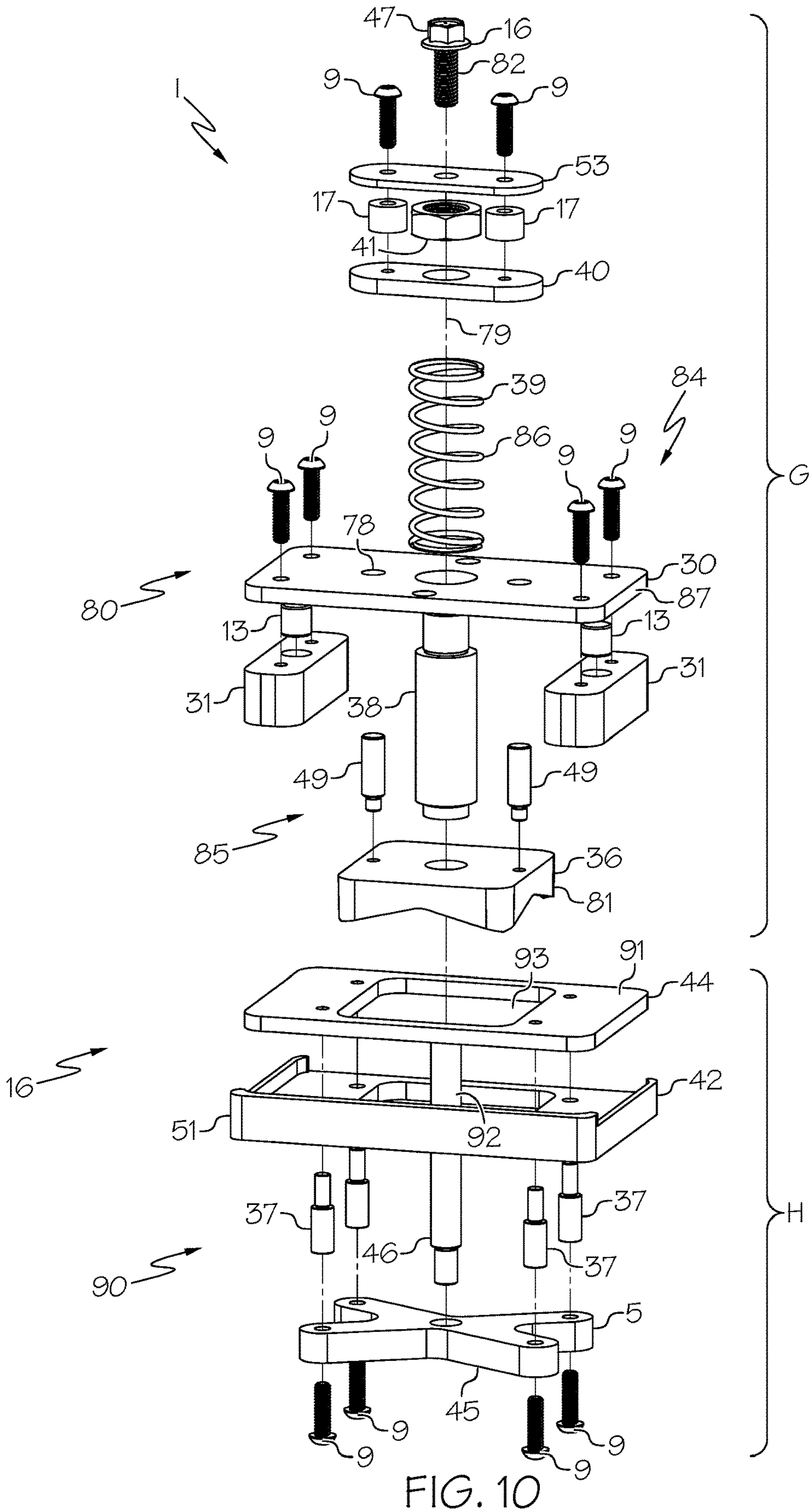
FIG. 10 is an exploded view of another embodiment of the invention.

FIG. 10 is an exploded view of an additional embodiment of the invention, hole punch I. Similar to punch F, punch I includes upper and lower bodies or subassemblies G and H. The upper body or subassembly G includes a guide plate 30 connected to a pair of spaced-apart end guides 31. A hollow shaft or sleeve 38 extends upwardly through a hole in guide plate 30. The lower end of sleeve 38 is secured to male punch 36. A pair of guide pins 49 are secured at their lower ends to male punch 36 as well. The upper ends of pins 49 extend through corresponding holes in plate 30, thus providing for relative sliding movement between the plates. A jam nut 41 is threadedly secured to the upper end of sleeve 38 over an upper handle 40. In some embodiments, hardened washer 53 is positioned on top of jam nut 41. A compression spring 39 is provided around sleeve 38 between plate 30 and upper handle 40 so that the male punch 36 is normally biased upwardly out of cutting engagement.

The lower subassembly H includes a hollow body or guide 42 and a female die plate 44 that fits into a recess in the top surface of the body 42. A raised lip 51 is preferably provided along one edge of guide 42 to facilitate accurate positioning of the punch F in the rain gutter C, as best seen in FIG. 5. The lower body or subassembly H also includes a punch shaft 46 secured at its lower end to a lower handle 45. Standoff posts 37 are secured between handle 45 and female die plate 44 so that the upper end of the punch shaft 46 extends upwardly through the central openings in the die plate and into or toward the upper body or subassembly G. To use, after a pilot hole had been formed in gutter C, upper subassembly G is positioned within gutter C. Guide plate 30 is sized so that subassembly G is properly positioned and aligned within gutter C. Lower subassembly H is positioned beneath gutter C but adjacent to upper subassembly G with punch shaft 46 extending toward or through the pilot hole, hollow body 42, and female die plate 44. As bolt 47 is lowered through the upper assembly G, it will pass through shaft or sleeve 38, guide plate 30 and male punch 36. At this stage it will engage punch shaft 46. As the user rotates bolt 47, it will cause shaft 38 and male punch 36 to move downward, cutting a hole in gutter C.

While punch F has magnets 32 that are preferably located in the opposing surfaces of guides 31 and 42 for releasably retaining the upper and lower subassemblies G and H together when positioning punch F in gutter C, punch I has magnets and/or magnetized guides 31 and 42. Similar to the other embodiments, the magnetic force releasably connects upper and lower subassemblies G and H together when positioning punch I. In some embodiments of both Punches F and punch I, only guides 31 will have magnets or be magnetized. In this embodiment, guide 42 and/or die plate 44 will be constructed of steel or other material that is attracted to the magnetic force of guide 31. If other embodiments, only guide 42 and/or die plate 44 will contain magnets or be magnetized. In this embodiment, the magnetic force from guide 42 and/or die plate 44 will attract guides 31 which are constructed of steel or other magnetic material. In some embodiments, body 42 and guides 31 are constructed of plastic, with guides 31 have embedded magnets, and die plate 44 is made of a magnetic material such as metal. In this embodiment, the magnets in guides 31 are attracted to magnetic die plate 44.

Figure 11B:
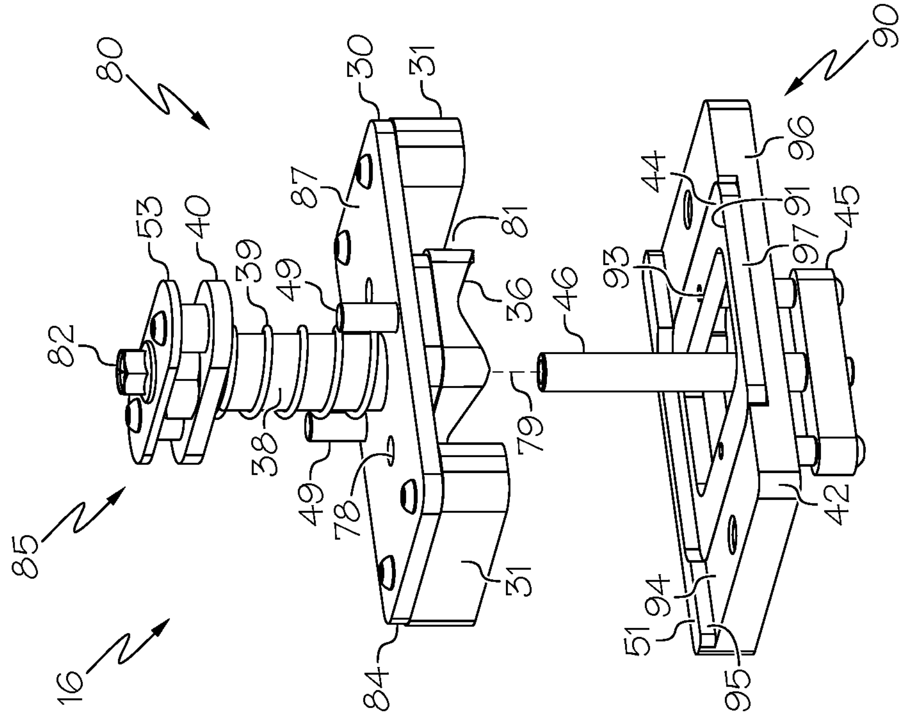
FIGS. 11A and 11B show another embodiment of the invention.
Figure 11A:
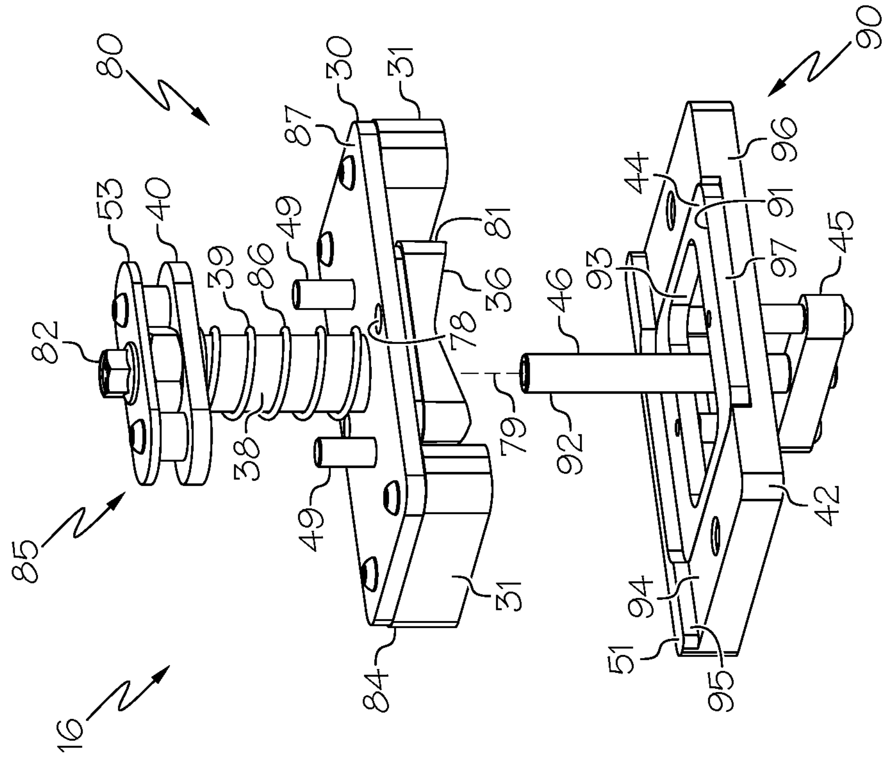

One embodiment of the invention is a hole punch that can punch holes that are longer in either the longitudinal or cross dimension of a gutter C. Some punches will produce openings that are longer in one dimension than the other dimension; for example, 2×3 inches or 3×4 inches. As used herein, an A-cut is when the longer dimension is aligned with the longitudinal axis of the gutter C. A B-cut is when the shorter dimension is aligned with the longitudinal axis of the gutter C. As shown in FIGS. 11A and 11B, certain embodiments of the invention allow for one punch to produce either A-cuts or B-cuts. In some embodiments of the invention, when top assembly G is positioned within gutter C, the dimensions of guide plate 30 are such that a pair of opposing sides fit snuggly in the bottom of gutter C. In some embodiments, the hole punch is longer in the dimension that runs parallel to the length of gutter C. In this case, the hole punch cannot be rotated 90° to make a cut in the other direction as the guide plate will no longer fit into the bottom of gutter C. Similarly, in some embodiments lower subassembly has lip 51 which aligns with the side of the gutter opposite the building side of the gutter. This too cannot be rotated 90° as the lip will no longer align with the gutter. To allow for both cuts to be made, the punch 36 of the top subassembly and the guide plate 44 of the lower assembly can both be rotated 90° (see FIGS. 11A and 11B). For the upper subassembly, by pushing on upper handle 40 against the force of spring 39, male punch 36 and pins 49 will be moved away from guide plate 30 until pins 49 are no longer within holes of guide plate 30. At this stage, upper handle 40 (and male punch 36) can be rotated 90°. After rotating, the pushing force is released and spring 39 causes male punch 36 to move back towards guide plate 30 and pins 49 are positioned in a set of holes 90° displaced from where they were before the rotation. For the lower assembly, handle 45, female die plate 44, and punch shaft 46 are secured to each other. This assembly can be removed from body 42, rotated 90°, and repositioned win body 42.

Figure 12A:
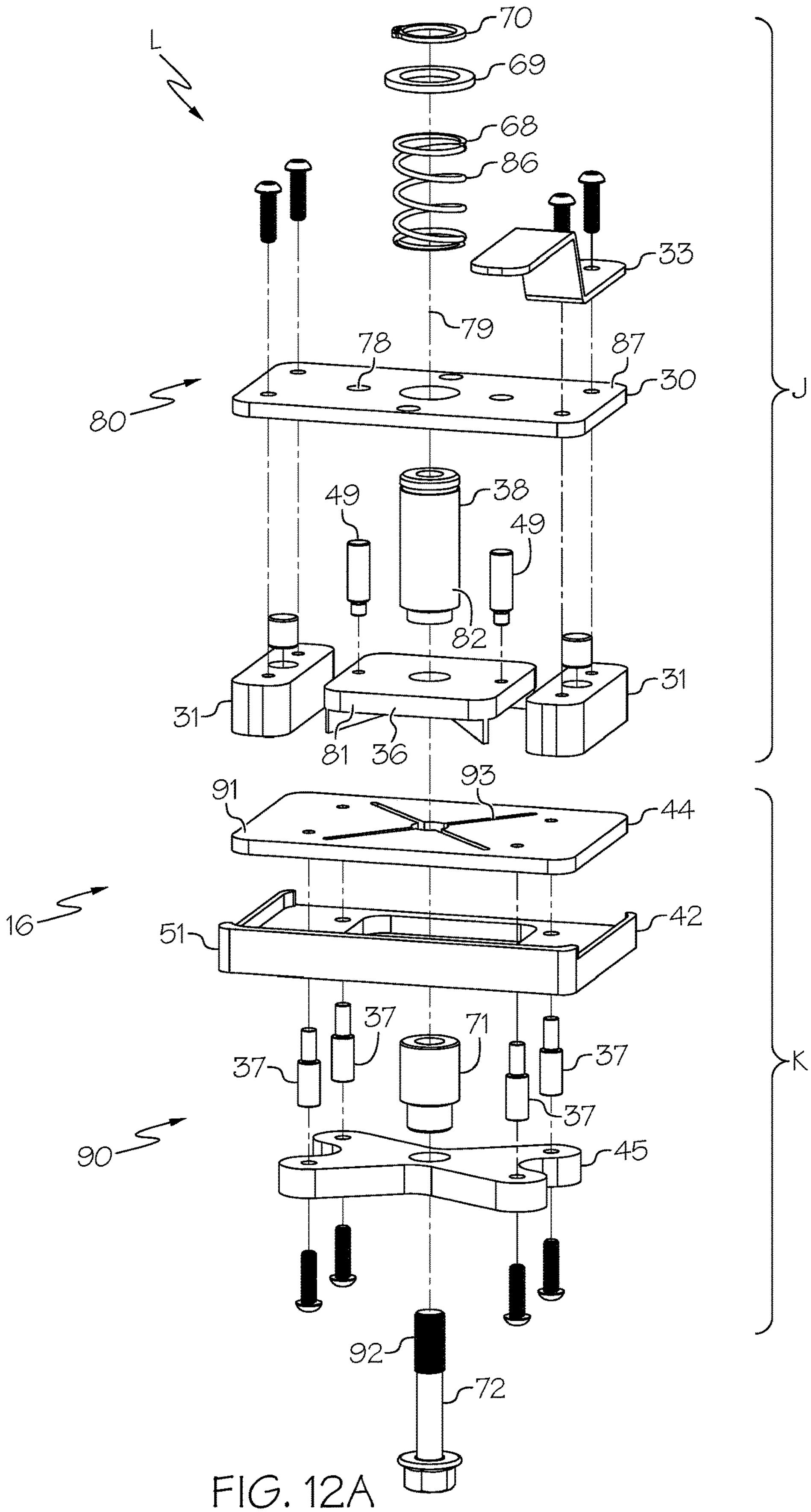
FIGS. 12A, 12B, and 12C show another embodiment of the invention.

Some gutters, such as those sold under the trademark Leaf Guard™, do not have an open top as is shown with gutter C in FIG. 5. Rather, they are formed such that only a small segment of one side is open, see the cross section of gutter C', shown in FIG. 12C. Certain embodiments described herein will also work with this type of gutter. An exploded view of punch L is shown in FIG. 12A. Punch L is similar to other punches described herein, except for, among other items, the force needed to send punch 36 through gutter C' is supplied by a pulling force from below the lower subassembly K instead of a compressive force supplied from the top of the upper assembly as is shown in other embodiments. FIG. 12A is an exploded view of an additional embodiment of the invention, hole punch L. Similar to punches F and I, punch L includes upper and lower bodies or subassemblies J and K. The upper body or subassembly J includes a guide plate 30 connected to a pair of spaced-apart end guides 31. A hollow shaft or sleeve 38 extends upwardly through a hole in guide plate 30. The lower end of sleeve 38 is secured to male punch 36. A pair of guide pins 49 are secured at their lower ends to male punch 36 as well. The upper ends of pins 49 are configured to slide through openings in plate 30. Shaft 38 is slidable within an opening of guide plate 30 to provide for relative sliding movement of punch 36. Retaining clip 70 is secured to the upper end of sleeve 38 over a spacer 69 that holds spring 68 tightly against guide plate 30. Handle 33 is secured to guide plate 30.

The lower subassembly K includes a hollow body or guide 42 and a female die plate 44 that fits into a recess in the top surface of the body 42. A raised lip 51 is preferably provided along one edge of guide 42 to facilitate accurate positioning of the punch L in the rain gutter C', as best seen in FIG. 12C. The lower body or subassembly K also includes a shaft 71 secured at its lower end to a lower handle 45. Standoff posts 37 are secured between handle 45 and female die plate 44 so that the upper end of the punch shaft 46 extends upwardly through the central openings in the die plate 44. Threaded bolt 72 is also provided. The threads of bolt 72 engage with the lower end of shaft 38. During use, as bolt 72 is rotated, shaft 38 will be pulled in the direction of die plate 44 and guide 42. As the end of shaft 38 is attached to male punch 36, rotation of bolt 72 will force male punch 36 through gutter C' and will make the desired hole. FIG. 12A shows male punch 36 as having an X cut as shown in FIG. 7. However, a male punch as shown in FIG. 8 can also be used to make a rectangular opening. As discussed herein, other shapes can be used for punch 36. In some embodiments, only guides 31 will have magnets or be magnetized. In this embodiment, guide 42 and/or die plate 44 will be constructed of steel or other material that is attracted to the magnetic force of guide 31. If other embodiments, only guide 42 and/or die plate 44 will contain magnets or be magnetized. In this embodiment, the magnetic force from guide 42 and/or die plate 44 will attract guides 31 which are constructed of steel or other magnetic material. In some embodiments, both guides 31 and guide 42 and/or die plate 44 will have magnets or be magnetized.

Figure 12B:
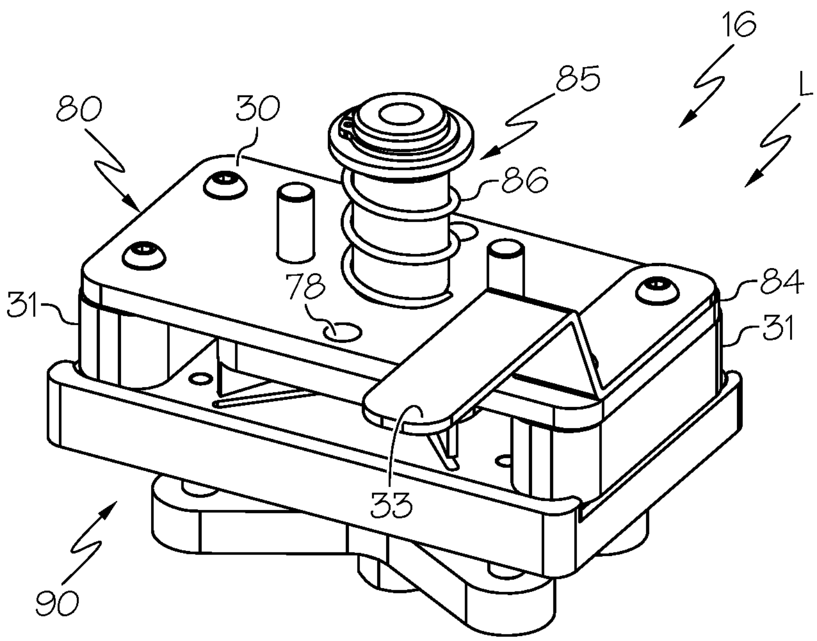
Figure 12C:
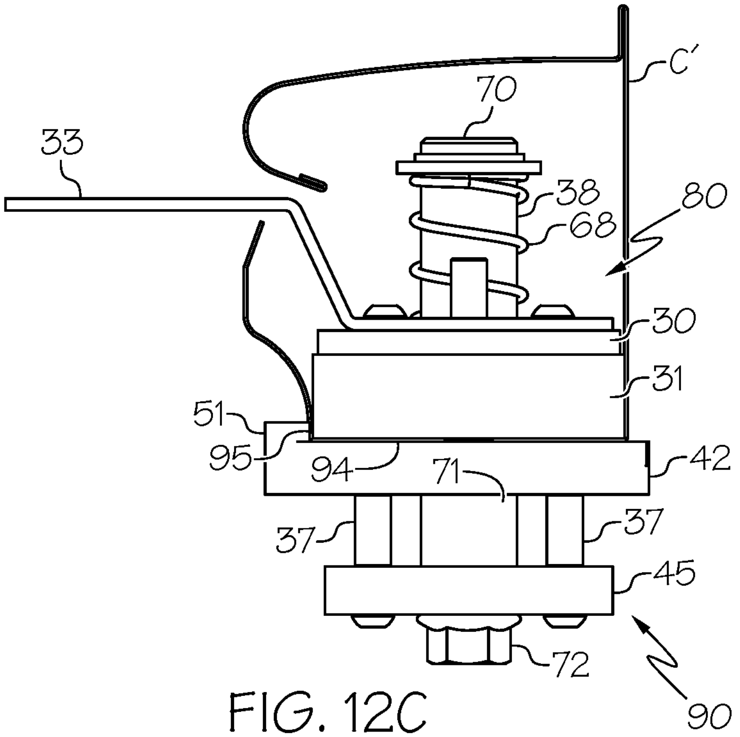

FIG. 12B is a perspective of assembled punch L. In FIG. 12C, punch L is shown in a cross section of gutter C'. Either on the ground or after being attached to a building, punch L can be used with the type of gutters C'. Prior to attaching an end cap, the top subassembly J can be positioned in gutter C'. Using handle 33, it can be moved to the appropriate position. Prior to positioning top subassembly J, a pilot hole will be drilled in the approximate center of the lower section of gutter C' in the longitudinal position as desired. Once top subassembly is positioned, lower subassembly K is position beneath upper subassembly J. The two subassemblies will stay 'attached' due to the magnetic force discussed above. Threaded bolt 72 can be inserted through shaft 71 and into engagement with the threaded interior of shaft 38. Continued rotation of bolt 72 will pull male punch through gutter C' and through die plate 44, making the desired hole in gutter C'. To remove, bolt 72 is unthreaded and lower subassembly is removed. Upper subassembly J can then be moved to a new location within gutter C' or removed from the gutter.

In another embodiment of punch L, the interior of shaft 71 is threaded. In this embodiment, if bolt 72 comprises and unthreaded section with a diameter smaller than the threaded section, bolt 72 can be threaded through shaft 71 so that it can freely move upward but, due to the threads of the bolt and shaft, it cannot move downward except through rotation. This feature helps prevent the user from dropping bolt 72 during assembly of punch L. After the top and bottom assemblies, J and K, are positioned, upward movement of bolt 72 will cause the end of the bolt to move through the opening of guide 44 and toward or through the pilot hole in gutter C'. Once the tip of bolt 72 engages shaft 38, the user can rotate bolt 38 to effect the punching.

In the embodiments discussed herein, some or all of the surfaces of the various punches that touch the gutter can be treated with Plasti Dip™ or other similar rubberized or plasticized coating to prevent the punch from scratching the gutters. For punch L, handle 33 can likewise be coated. In other embodiments, the pieces of the punch that touch the gutter can be made of plastic. In the event that the plastic pieces need to be magnetized, magnets can be embedded in the plastic.

In some embodiments, a punch assembly 16 comprises a first body 80 and a second body 90. In some embodiments, the first body 80 comprises a first die 81 and a first threaded member 82. In some embodiments, the second body 90 comprises a second die 91 and a second threaded member 92. In some embodiments, the first die 81 comprises a punch and the second die 91 comprises an aperture 93 arranged to receive the first die 81. Desirably, the first threaded member 82 and the second threaded member 92 are arranged to engage one another through a range of movement that pulls the first die 81 into the aperture 93 of the second die 91.

In some embodiments, a punch assembly 16 comprises a magnet 83 arranged to magnetically attract the first body 80 to the second body 90. In some embodiments, the first body 80 comprises a magnet 83. In some embodiments, the second body 90 comprises a magnet 83. In some embodiments, each of the bodies 80, 90 comprise one or more magnets 83.

In some embodiments, the first body 80 comprises a first portion 84, a second portion 85 and a spring 86. In some embodiments, the first portion 84 is moveable with respect to the second portion 85. In some embodiments, the first portion 84 comprises a guide plate 87. In some embodiments, the second portion 85 comprises the first die 81 and the first threaded member 82. In some embodiments, the spring 86 is arranged to bias the second portion 85 to a first position with respect to the first portion 84. In some embodiments, the first portion 84 comprises a magnet 83. In some embodiments, the second portion 85 is moveable with respect to the first portion 84 along an axis 79. In some embodiments, the second portion 85 is rotatable with respect to the first portion 84 about the axis 79. In some embodiments, the second portion 85 comprises a first orientation with respect to the first portion 84 (see e.g. FIG. 11A) and a second orientation with respect to the first portion 84 (see e.g. FIG. 11B). In some embodiments, the second orientation comprises a rotation of the second portion 85 with respect to the first orientation. In some embodiments, the second portion 85 comprises one or more guide pins 49 and the first portion 84 comprises one or more guide apertures 78. In some embodiments, a guide pin 49 is oriented in a first guide aperture in the first orientation and oriented in a second guide aperture in the second orientation.

In some embodiments, the second body 90 comprises a first surface 94 arranged to contact a workpiece C and a second surface 95 arranged to contact the workpiece C. In some embodiments, the first surface 94 is oriented at a non-zero angle to the second surface 95. In some embodiments, the first surface 94 is oriented at 90 degrees to the second surface 95. In some embodiments, the first surface 94 is arranged to contact the bottom surface of a gutter C and the second surface 95 is arranged to contact a corner and/or sidewall portion of the gutter C.

In some embodiments, the second body 90 comprises a body member 96 and a die member 97, the die member 97 comprising the second die 91. In some embodiments, the body member 96 comprises a cavity arranged to receive the die member 97. In some embodiments, the die member 97 comprises a first orientation with respect to the body member 96 (see e.g. FIG. 11A) and is repositionable to a second orientation with respect to the body member 96 (see e.g. FIG. 11B). In some embodiments, the second orientation comprises a rotation of the die member 97 with respect to the first orientation. In some embodiments, the body member 96 comprises a magnet 43 arranged to magnetically attract the die member 97.

As discussed herein, when the inventive hole punch is used to make holes in gutters, the upper portion or subassembly is aligned to the gutter by the body of the punch. The lower subassembly or portion is aligned to the gutter by the lip feature and to the top assembly the shaft is fed toward or through the pilot hole. Also as discussed above, the optional magnets or magnetized pieces will hold the bottom portion of subassembly adjacent to the upper portion or subassembly even when positioned on the other side of the gutter.

From the foregoing, it will be appreciated that the present invention comprises an improved gutter hole punch having several advantages over the prior art. One significant advantage is that the gutter punch herein is of relatively lightweight, compact construction for quickly and accurately cutting holes either before or after the gutters are hung, which in turn results in overall efficiencies and cost savings in gutter installation. The gutter hole punch herein is adjustable and readily adapted for forming either holes or X cuts. Other advantages will be evident to those skilled in the art.

Although particular embodiments of the invention have been illustrated in the accompanying drawings and described in the foregoing detailed description, it will be understood that the invention is not limited only to the embodiments disclosed, but is intended to embrace any equivalents, modifications and/or rearrangements of elements falling within the scope of the invention disclosed herein. The present invention relates generally to tools for cutting holes in metal, and more particularly to a hole punch to be used with rain gutters.

In the detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure. In some embodiments, terms like upper and lower are used. These are relative terms and do not indicate required positioning.

As used herein, designators such as "X", "Y", "N", "M", etc., particularly with respect to reference numerals in the drawings, indicate that a number of the particular feature so designated can be included. It is also to be understood that the terminology used herein is for the purpose of describing particular embodiments only and is not intended to be limiting. As used herein, the singular forms "a", "an", and "the" can include both singular and plural referents, unless the context clearly dictates otherwise. In addition, "a number of", "at least one", and "one or more" (e.g., a number of pivot points) can refer to one or more pivot points, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement of the movable handle member, as appropriate to the context.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

What is claimed is:

1. A punch comprising:

a first body comprising a first portion, a second portion and a spring, the second portion moveable with respect to the first portion, the spring arranged to bias the second portion to a first position with respect to the first portion, the first portion comprising a guide plate, the second portion comprising a first die and a first threaded member; and a second body comprising a second die and a second threaded member, the second die comprising an aperture arranged to receive the first die, the second threaded member arranged to engage the first threaded member;

wherein rotation of the first threaded member with respect to the second threaded member causes the first die to move with respect to the second die.

2. The punch of claim 1, the second body portion comprising a first contacting surface arranged to contact a workpiece and a second contacting surface arranged to contact the workpiece, the first contacting surface oriented at an angle to the second contacting surface.

3. The punch of claim 1, the second portion of the first body rotatable with respect to the first portion.

4. The punch of claim 1, the second body comprising a body member and a die member, the die member comprising the second die, the die member detachable from the body member.

5. The punch of claim 4, the body member comprising an aperture, the second threaded member extending through the aperture.

6. The punch of claim 5, the second body comprising a tubular shaft.

7. The punch of claim 6, the tubular shaft comprising a cavity, the second threaded member oriented in the cavity.

8. The punch of claim 4, the die member attachable to the body member in a first orientation and a second orientation.

9. The punch of claim 1, comprising a magnet arranged to magnetically attract the first body to the second body.

10. The punch of claim 1, the first portion comprising a guide aperture, the second portion comprising a guide pin, the guide pin oriented in the guide aperture.

11. A punch comprising:

a first body comprising a first die and a first threaded member;

a second body comprising a second die and a second threaded member, the second die comprising an aperture arranged to receive the first die, the second threaded member arranged to engage the first threaded member; and a magnet arranged to magnetically attract the first body to the second body;

wherein rotation of the first threaded member with respect to the second threaded member causes the first die to move with respect to the second die.

12. The punch of claim 11, the second body comprising the magnet.

13. The punch of claim 11, the first body comprising the magnet.

14. The punch of claim 13, the first body comprising a first portion, a second portion and a spring, the second portion moveable with respect to the first portion, the spring arranged to bias the second portion to a first position with respect to the first portion, the first portion comprising the magnet, the second portion comprising the first die.

15. The punch of claim 14, the second body comprising a guide and the second die, the second die comprising a first orientation with respect to the guide, the second die repositionable to a second orientation with respect to the guide.

16. A punch comprising:

a first body comprising a first die and a first threaded member; and a second body comprising a guide, a second die and a second threaded member, the second die comprising an aperture arranged to receive the first die, the second threaded member arranged to engage the first threaded member, the second die comprising a first orientation with respect to the guide, the second die repositionable to a second orientation with respect to the guide;

wherein rotation of the first threaded member with respect to the second threaded member causes the first die to move with respect to the second die.

17. The punch of claim 16, comprising a magnet arranged to attract the first die to the guide.

18. The punch of claim 16, the second orientation comprising a rotation with respect to the first orientation.

19. The punch of claim 16, the first body comprising a first portion, a second portion and a spring, the second portion moveable with respect to the first portion, the spring arranged to bias the second portion to a first position with respect to the first portion, the first portion comprising a guide plate, the second portion comprising the first die and the first threaded member.

20. The punch of claim 19, the first die moveable along an axis, the first die rotatable about the axis.

* * * * *